P. NICOLE.
INSTRUMENT FOR DIVIDING LENGTHS ACCORDING TO THE GOLDEN SECTION.
APPLICATION FILED AUG. 9, 1917.
Patented June 4, 1918.
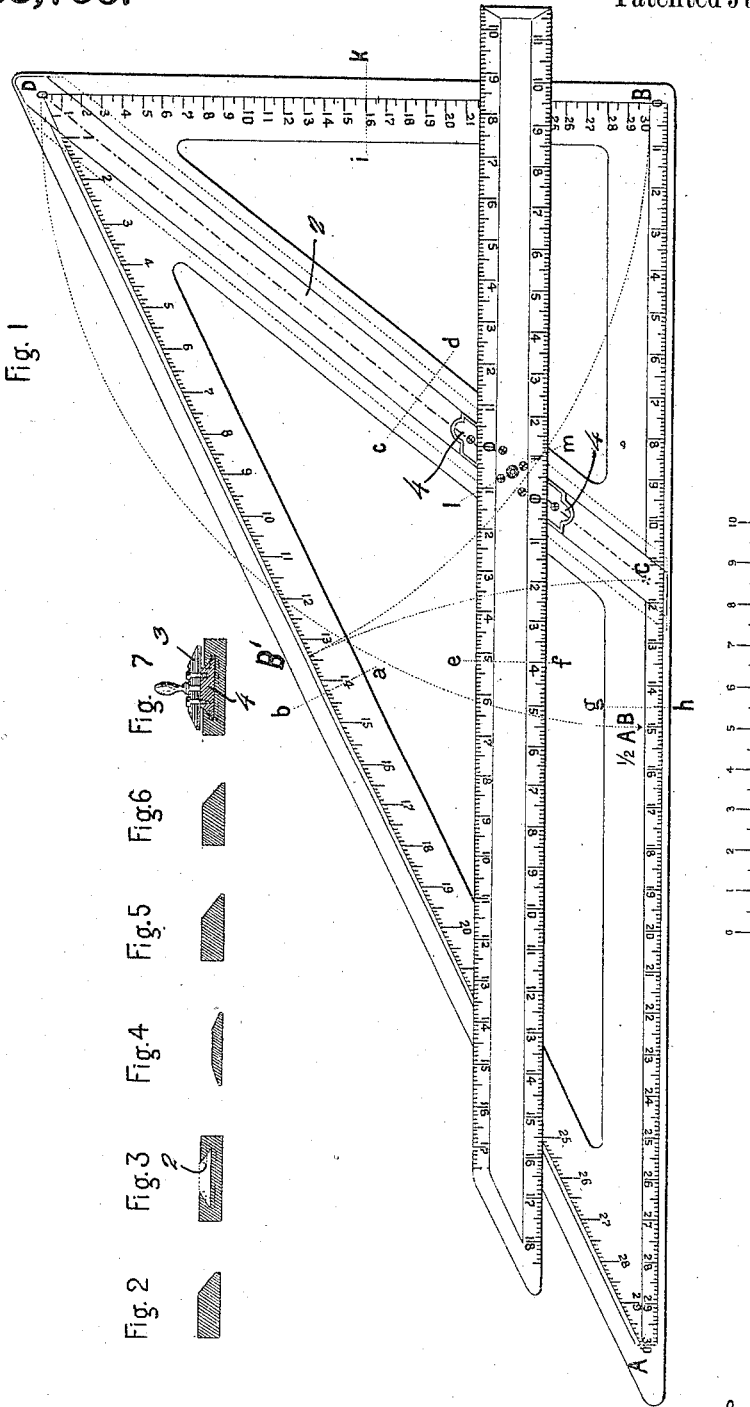

UNITED STATES PATENT OFFICE.

PAUL NICOLE, OF LAUSANNE, SWITZERLAND.

INSTRUMENT FOR DIVIDING LENGTHS ACCORDING TO THE GOLDEN SECTION.

1,268,756.  Specification of Letters Patent.  Patented June 4, 1918.

Application filed August 9, 1917. Serial No. 185,278.

*To all whom it may concern:*

Be it known that I, PAUL NICOLE, a citizen of Switzerland, residing at Lausanne, Canton of Vaud, in the Confederation of Switzerland, have invented certain new and useful Improvements in Instruments for Dividing Lengths According to the Golden Section, of which the following is a specification.

The present invention relates to an instrument for dividing up lengths or numbers according to the golden section, making it possible without any figuring, and merely by the simple adjustment of the instrument to read in numbers the relative values of a division made according to the golden section.

The golden section is the well-known solution of the problem to divide a line up into two unequal parts so as to have the same relation between the whole line and its larger section, as between this larger section and the smaller, or the relation after the formula:

$$\frac{A-B}{AC} = \frac{AC}{CB},$$

if A B is the entire length of a line forming the base line, and C the point of division on this line (see Fig. 1 of the accompanying drawing).

In dividing the base-line A—B according to the given formula the operation is as follows: Bisect base-line A B, erect a perpendicular B D at B equal in length to ½ A B, describe an arc with radius equal to ½ A B from B, join A D, from D describe an arc B B¹ and from A an arc B′ C and join D C. The line D C will then divide the base-line A B into two unequal parts A C and B C which are the proportional lengths sought and answer to the formula given.

If line A B is assumed to move parallel to itself, that is to say, to keep always at right angles to the line B D and if a zero point is kept on this line, the length of the line A B will have to be read on the line A D or on its extension. In each different position of line A B, the triangles remaining similar and the line C D remaining stationary, this line will divide the line A B in two sections having the desired relationship. On one side there will be a shorter section and on the other side a longer section, and both sections begin at the line C D, while the intersecting point with the line B D, will indicate the length of the shorter section, and the intersecting point with the line A D, the length of the longer section. All this may be accomplished with the instrument made according to the present invention.

The instrument made according to this invention comprises a triangular device provided on its three sides with scales of the same number of units and includes a straight edge also provided with a scale on both its edges, both scales of the straight edge corresponding to the scale of the larger cathetus; the latter scale has its zero point at the apex of the right angle, while the zero point of each scale of the straight edge is common to two sections running in opposite directions; the scale on the hypotenuse is a projection of the scale on the larger cathetus, the projection being made parallel to the smaller cathetus; the straight edge is adapted to assume in the device positions parallel to the larger cathetus, in all of which positions its zero points are on a transverse line which divides according to the golden section each right line parallel to the larger cathetus, and is limited by the scale line on the other side of the triangle namely the hypotenuse and the smaller cathetus.

In the drawing:

Figure 1 is a plan view of the instrument made in accordance with my invention.

Fig. 2 is a cross section on line *a—b* Fig. 1.

Fig. 3 is a cross section on line *c—d* Fig. 1.

Fig. 4 is a cross section on the line *e—f* Fig. 1.

Fig. 5 is a cross section on the line *g—h* Fig. 1.

Fig. 6 is a cross section on the line *i—k* Fig. 1, and

Fig. 7 is a cross section taken on the line *l—m* Fig 1.

This instrument comprises a bottom plate shaped like a draftsman's triangle provided with scales on its three sides as hereinbefore described, and a flat rule or straight edge provided with scales on its two edges as hereinbefore described, and fitted so as to slide and remain parallel to the base-line A B. The member in which the straight edge slides is a transverse brace in the bottom plate, and this brace is located in the dividing line C D, dividing A B according to the golden section. Both bottom plate and straight edge may be made of metal or wood or any suitable material, and provided with layers of celluloid at the parts carrying the scales.

The scale on the base-line A B or the larger cathetus is made in units and tenths of units with its zero point at B. The scale of the hypotenuse A D with its zero point at D, is a projection of the scale on larger cathetus A B, this projection being made parallel to the smaller cathetus B D. The scale on the smaller cathetus B D, has its zero point at D and is divided into units which are one half the length of the previous units and consequently of the same number of units as the scales on the larger cathetus and the hypotenuse. The scales on the straight edge are similar and correspond to that on the larger cathetus A B except that their zero points are located on the dividing line C D and the units of both these scales extend in both directions from their zero points.

The brace of the bottom plate is provided with a groove 2, of which the dividing line C D is the geometrical axis, and the straight edge has a button 3 fitted thereto and screwed to a slide 4 which is movable within said groove. The construction is such that when the slide 4 moves along the groove 2, the straight edge is always parallel to line A B and the zero points of its scales are always vertically above the dividing line C D, or, speaking from a geometrical standpoint, always coincide with this dividing line. The scale on the smaller cathetus on which there may also be read the zero points of the whole numbers or lengths to be divided up, is useful for determining whether the straight edge is maintained parallel to the larger cathetus A B.

Owing to the arrangement of the scales the instrument when being used may be grasped with the left hand, while resting the instrument with the larger cathetus upon a table or other support, so that the right hand may be employed to adjust the straight edge to the position in which one of its edges coincides exactly with the number representing the length to be divided as the same appears on the hypotenuse A D, the divisions of the scale on the hypotenuse being somewhat larger than those of the scale on the larger cathetus, and hence the more easily read. At the intersecting points of the scales of the straight edge with the scale on the hypotenuse, and the scale on the smaller cathetus, the searched for numbers may be read to ascertain the golden section. Thus for instance for the length 250 read on the hypotenuse, the scale on the straight edge indicates 154.5 and 95.5, and for the length 216 indicates 134 and 82.

It is evident that the units of the scales may be chosen at will, and also that on the smaller cathetus the scale may correspond to all the units in the scale on the hypotenuse or only predetermined units of said scale.

I claim as my invention:

1. An instrument of the class described comprising a triangle, a brace connecting the base of the triangle with the opposite angle the axis of which brace divides the base of the triangle according to the golden section, and a straight edge movable on said brace so as to assume at all times a position parallel to the base of the triangle, the said triangle and straight edge being provided with scales so that by adjusting the straight edge to position the golden section of a given dimension may be read thereon.

2. An instrument of the class described comprising a right angle triangle, a brace connecting the base of the triangle with the opposite angle, which brace has a groove therein while the axis thereof divides the base of a triangle according to the golden section, a slide movable in the groove in the said brace, and a straight edge secured to the said slide so as to assume at all times a position parallel to the base of the triangle the sides of the triangle and the straight edge being provided with scales so that by adjusting the straight edge to position the golden section of a given dimension may be read thereon.

3. An instrument of the class described comprising a right angled triangle the smaller cathetus of which is equal in length to one half of the larger cathetus or side of the triangle used as a base, a brace connecting the base of the triangle with the opposite angle, which brace has a groove therein while the axis thereof divides the larger cathetus or base of the triangle according to the golden section, a slide movable in the groove in the said brace, and a straight edge secured to the said slide so as to be parallel at all times to the larger cathetus or base of the triangle, the larger cathetus or base of the triangle, the smaller cathetus and the hypotenuse each being provided with a scale of the same number of suitable units, and the straight edge being provided with a scale the zero point of which lies above the axis of the said brace and extends in opposite directions therefrom, the units in this scale being the same length as the units in the scale on the larger cathetus or base of the triangle.

In testimony whereof I have affixed my signature in presence of two witnesses.

P. NICOLE.

Witnesses:
  EDW. EMMANUEL,
  W. SNELL.